July 28, 1931. R. C. BERRY 1,816,808
CLUTCH
Filed June 4, 1930 2 Sheets-Sheet 1

Inventor
ROBERT C. BERRY,
By
Attorneys

July 28, 1931.  R. C. BERRY  1,816,808

CLUTCH

Filed June 4, 1930  2 Sheets-Sheet 2

Inventor
ROBERT C. BERRY,

By *Alley Frask.*

Attorneys

Patented July 28, 1931

1,816,808

UNITED STATES PATENT OFFICE

ROBERT C. BERRY, OF INDIANAPOLIS, INDIANA, ASSIGNOR OF ONE-FOURTH TO ANDREW J. KLAISLER, OF INDIANAPOLIS, INDIANA

CLUTCH

Application filed June 4, 1930. Serial No. 459,188.

My invention is concerned with mechanical clutches of the type which transmit from a driving element to a driven element a torque which is generally proportional to the speed of the driving element and also to the difference in speed between the driving and driven element. A clutch of this general type is shown in my co-pending application Serial No. 259,974, filed March 8, 1928. The clutch of the present application, however, differs from my prior application in several respects, the nature of which will become apparent hereinafter.

Figure 1:
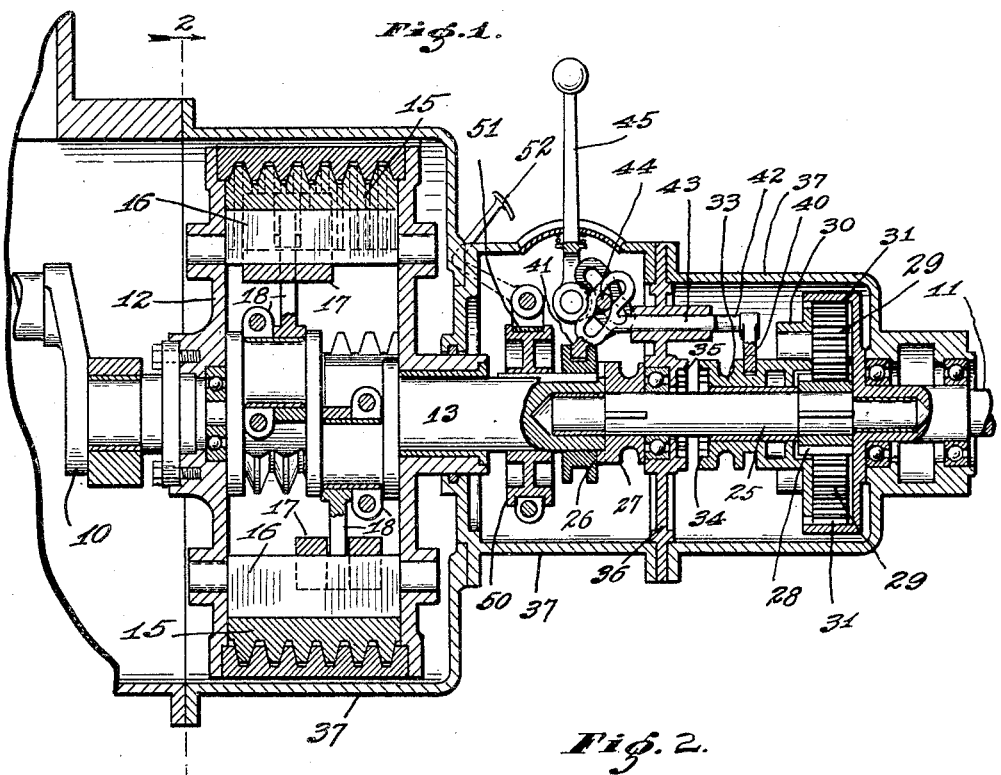
Figure 2:
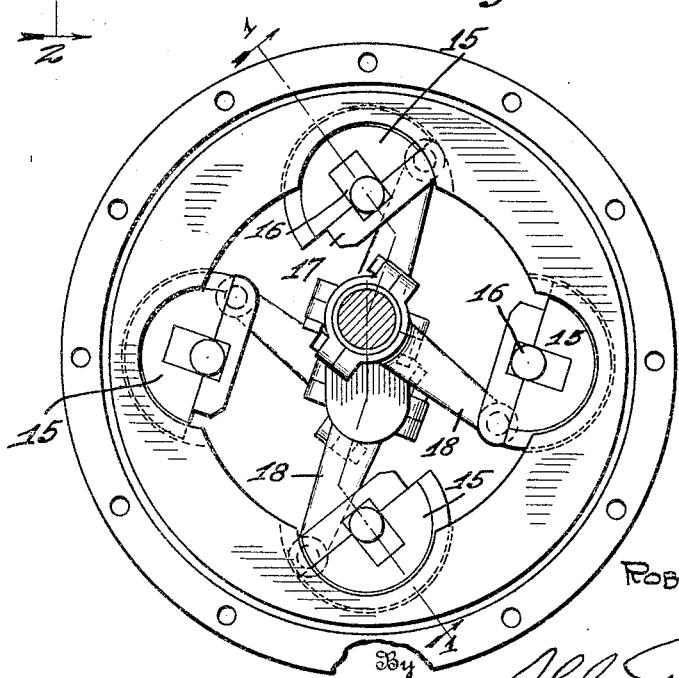
Figure 3:
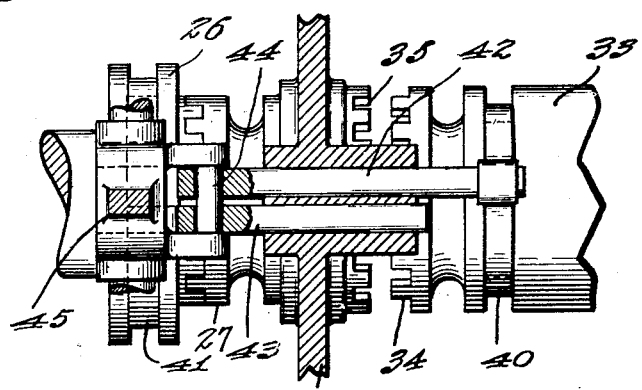
Figure 4:
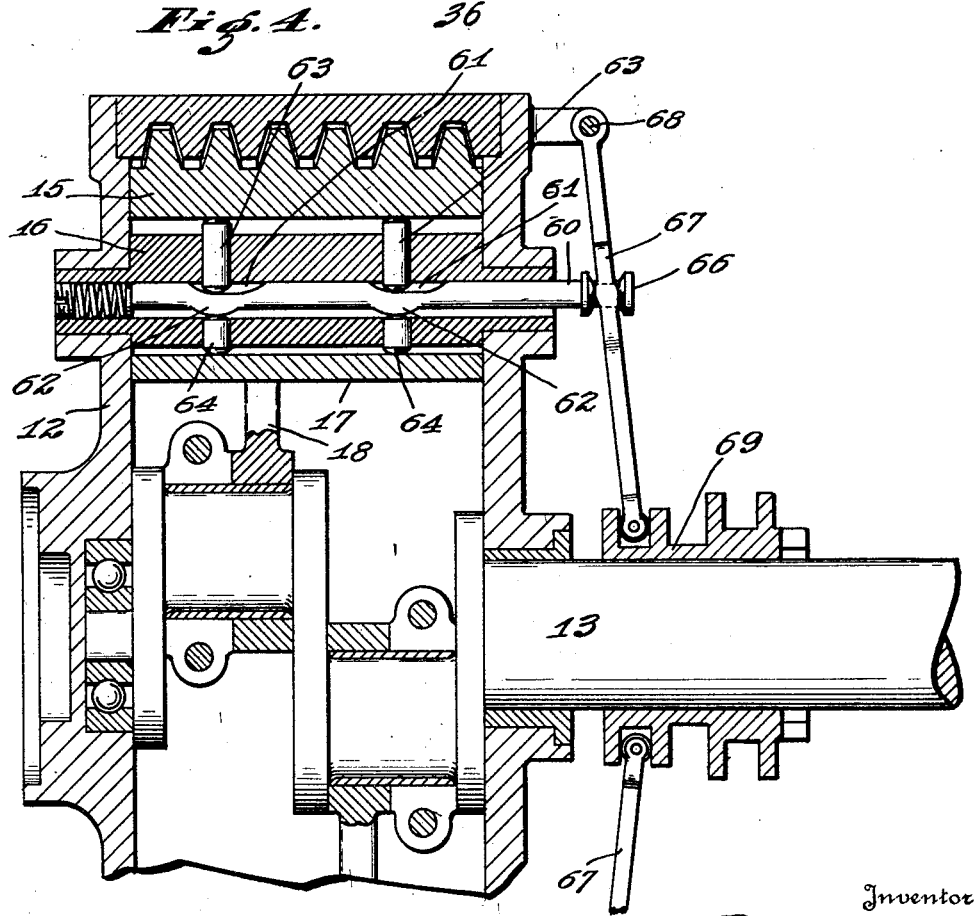

The accompanying drawings illustrate embodiments of my invention: Fig. 1 is a longitudinal section through one form of clutch on the line 1—1 of Fig. 2, showing the clutch in association with reverse gearing; Fig. 2 is a transverse section on the line 2—2 of Fig. 1 showing parts of the clutch in end elevation; Fig. 3 is a fragmental plan view illustrating details of construction of the clutch-control mechanism; and Fig. 4 is a fragmental longitudinal section similar to Fig. 1, but showing a modified form of the invention.

In the construction illustrated in Fig. 1, my clutch and its associated mechanism is employed to interconnect a source of power, such as a crank shaft 10 of an internal combustion engine, with a power-transmitting shaft 11. The clutch proper comprises a driving element in the form of a casing 12 which is connected to the source of power for rotation therewith. The driven element is in the form of a crank-shaft 13 which extends into the casing 12 coaxially therewith and is rotatable relatively thereto. At annular spaced points within the casing 12 there are pivotally mounted oscillatable shoes 15. As shown, there are four of such shoes, but the exact number is immaterial. Conveniently, the shoes are mounted upon trunnion pieces 16 pivotally supported in the end walls of the casing 12 and received in longitudinally extending grooves in the respectively associated shoes 15. A removable cap 17 may be employed for retaining each shoe in place on its associated trunnion piece.

At eccentric points, the shoes are connected to the crank-shaft 13 in such a manner that relative rotation of the crank shaft and casing 12 will cause the shoes to oscillate. This is conveniently accomplished by connecting rods 18. As shown, the crank shaft 13 has two diametrically opposite cranks each of which supports the big end of two connecting rods 18, the outer ends of which are respectively connected to eccentric points on adjacent shoes 15. This precise arrangement however, is not essential to my invention.

The outer surface of each of the shoes 15 is generally semicircular in contour, and is provided with a series of grooves lying respectively in planes perpendicular to the clutch axis. Adjacent each shoe, the interior circumferential wall of the casing 12 is provided with a recess, the face of which is grooved to create a series of semicircular ribs which extend into the grooves of the associated shoe 15, as is clear from Fig. 1.

Each of the shoes 15 is not connected rigidly with its associated trunnion piece 16 but is so mounted as to have a somewhat limited sliding movement radially of the trunnion axis in order that centrifugal force created by rotation of the casing 12 will tend to force the shoes 15 outwardly to cause frictional contact between the interengaging walls of the grooves on the shoe and casing.

From the construction described, it will be apparent that relative rotation of the casing 12 and crank-shaft 13 will be accompanied by oscillation of the shoes 15 about their respective axes of pivotal mounting in the casing 12. This oscillation is of course opposed by the inertia of the shoes and by the friction existing between the interengaging faces of the shoe and casing grooves. The greater the relative speed of rotation between the crankshaft and casing, the greater will be the inertia forces opposing such relative rotation. Further, the greater the speed of rotation of the casing 12, the greater will be the centrifugal force acting on the shoes 15; and the greater this centrifugal force, the greater will be the friction opposing oscillation of the shoes.

In the construction shown in Fig. 1, the driven element 13 of the clutch proper is not directly connected to the power-transmitting shaft 11. Instead, there is mounted between the driven element and the power-transmitting shaft 11 an intermediate shaft 25 which can be connected to the shaft 11 either directly or through reverse gearing and which can at will be connected to or disconnected from the shaft 13. For the purpose of effecting the latter control, the adjacent ends of the shafts 13 and 25 may be provided respectively with co-operating clutch members such as the jaw-clutch members 26 and 27, the engaging faces of which are provided with co-operating clutch teeth.

For the purpose of connecting the intermediate shaft 25 to the power-transmitting shaft 11 either directly or through reverse gearing, I may mount rigidly on the end of the shaft 25 a pinion 28 which meshes with a plurality of planetary gears 29 rotatably mounted on individual axes in a support 30 that in turn is rotatable on and axially slidable along the shaft 25. In addition to meshing with the central pinion 28 on the shaft 25, the planetary gears 29 also mesh with an internal gear 31 rotatable with the shaft 11.

The periphery of the support 30 is provided with a series of teeth adapted to engage the teeth of the internal gear 31 when the support 30 is in the position illustrated in Fig. 1. Integral or rigid with the support 30 is an axially extending hub 33, the end face of which is provided with a series of jaw-clutch teeth 34 adapted to mesh with a corresponding series of stationary teeth 35 conveniently provided on a partition 36 in a casing 37 that incloses the whole mechanism.

With the support 30 and its associated hub 33 in the position illustrated in Fig. 1, the intermediate shaft 25 is directly connected to the power-transmitting shaft 11; for the interengagement of the teeth at the periphery of the support 30 with the teeth of the internal gear 31 prevents relative rotation of such member, thus locking the planet gear 29 to the internal gear 31 and in turn to the pinion 28 which is rigid with the shaft 25. When the support 30 and its associated hub 33 are moved to the left from the position shown in Fig. 1, the teeth at the periphery of the support 30 move out of engagement with the gear 31, and the clutch teeth 34 on the hub 33 engage the stationary teeth 35 to prevent rotation of the planet-gear-support 30. Both the pinion 28 and the internal gear 31 are of such a face-width that the planet gears 29 remain in engagement with them during this axial movement of the planet-gear support 30; and as a result, rotation of the shaft 25 will cause rotation of the shaft 11 in the reverse direction and at a reduced speed.

In order to effect the axial movement of the planet-gear carrier 30 and the positive-clutch member 26, these members may be respectively provided with annular grooves for the reception of shifter forks 40 and 41, these shifter forks being in turn respectively mounted upon longitudinally slidable shifter rods 42 and 43. (See Figs. 1 and 3.) The shifter rods 42 and 43 lie adjacent and parallel to each other and are provided with cam slots adapted to receive a pin 44 eccentrically supported on a pivotally mounted control lever 45.

As indicated in Fig. 1, the control lever 45 is in its central position, and the pin 44 lies near the center of each of the cam slots in the shifter rods 42 and 43. The clutch member 26 on the shaft 13 is in engagement with the clutch member 27 on the intermediate shaft 25, and the planet-gear carrier 30 is in engagement with the internal gear 31 on the power-transmitting shaft 11. The cam slots in the shifter rods 42 and 43 are so shaped that movement of the control lever 45 in one direction will cause movement of one shifter rod and movement of the control lever in the opposite direction will cause movement of the other shifter rod. In the particular construction shown, movement of the upper end of the control lever 45 to the left, through the action of the cam slot in the shifter rod 43, will move such shifter rod to the left and disengage the clutch member 26 from the clutch member 27. During this movement of the control lever 45, the pin 44 rides in a portion of the cam slot in the shifter rod 42 which is concentric to the axis about which the pin 44 is swinging, so that no movement of the shifter rod 42 results, and the planet-gear carrier 30 remains in engagement with the internal gear 31. Movement of the control lever 45 to the right from the central position shown in Fig. 1 will cause the shifter rod 42 to be moved to the left to disconnect the planet-gear carrier from the internal gear 31 and to connect it to the stationary partition 36. During this movement of the control lever 45, the pin 44 rides in a portion of the slot in the shifter rod 43 which is concentric to the axis of pivotal mounting of the lever 45, and no movement of the shifter rod 43 results.

In my prior application above referred to, instead of employing rigid cranks on the driven element of the clutch, I provided adjustable eccentrics, the centers of which could be brought into coincidence with the axis of the clutch in order to eliminate any tendency of the driving member to drive the driven member. In the construction illustrated in Fig. 1 of this application, however, I contemplate that the source of power will have associated with it speed-controlling means through which its rotational speed can be made to be comparatively slow. By providing a brake for the shaft 13, thereof, I can stop rotation of such shaft; and, because of the low rate of speed at which the crank shaft 10 can be made to rotate, the resultant oscillation of the shoes 15 will not be at an objectionable rate. The brake which I may employ in association with the shaft 13 is shown as comprising a brake drum 50 which is rigid with the shaft 13 and which has associated with it a brake shoe 51 controlled by a brake pedal 52.

When the clutch is not in operation—that is, when it is not being employed to interconnect operatively the crank shaft 10 and power transmitting shaft 11—the lever 45 will be moved to the left from the central position illustrated in Fig. 1; and when the lever is so moved the positive clutch member 26 will be out of engagement with its associated clutch member 27, and the crank-shaft 13 can therefore rotate freely relative to the intermediate shaft 25. The rate at which the shaft 13 rotates will depend upon the friction opposing its rotation. If the friction opposing its rotation is negligible, it will rotate at substantially the same speed as does the crank-shaft 10 of the engine, and there will be substantially no oscillation of the shoes 15. By depressing the brake pedal 52, however, a frictional drag is imposed on the clutch-shaft 13, which frictional drag tends to decrease the rate at which the shaft 10 rotates, thus creating or increasing the rate of relative rotation of the clutch shaft and clutch casing 12. This increase in the rate of relative rotation of the casing and clutch shaft creates an increase at which the shoes 15 oscillate, and the effect of the inertia and friction opposing oscillation of such shoes tends to oppose relative rotation of the shaft 13 and casing 12. If the braking effort created by depressing the brake pedal 52 is of sufficient extent, however, the shaft 13 can be stopped completely. This will enable the clutch members 26 and 27 to be brought into engagement without clashing.

After the clutch members 26 and 27 have been engaged, by moving the lever 45 from its left-hand position to the central position illustrated in the drawing, and after releasing the brake pedal 52, the extent to which rotation of the clutch shaft 13 is opposed will depend upon the opposition to rotation possessed by the power-transmitting shaft 11.

If the shaft 11 possesses substantially no opposition to rotation, it will rotate at approximately the same rate of speed as does the crank-shaft 10 of the engine. If the opposition of the shaft 11 to rotation increases, then its speed will decrease, with the result that the relative rate of rotation between the clutch shaft 13 and casing 12 will be increased. This in turn will increase the rate at which the shoes 15 oscillate; and the effect of the inertia of the shoes 15 and of frictional drag between the shoes and the casing 12 will oppose relative rotation of the crank-shaft 10 and power-transmitting shaft 11. Should the rotational speed of the crank shaft 10 be increased, the increase in the centrifugal force acting on the shoes 15 will cause an increase in the frictional drag between such shoes and the casing; and this, in turn, will increase the rate at which the shaft 11 rotates, if the torque opposing its rotation has not been correspondingly increased.

As has been previously stated, the torque transmitted to the driven element 13 of the clutch proper is dependent to an extent upon the rotational speed of the casing 12 owing to the fact that rotational speed of the casing 12 determines the centrifugal force acting on the shoes 15 and thereby controls the friction between such shoes and the casing 12. If the rotational speed of the casing 12 cannot be reduced beyond a point where torque transmitted to the driven clutch element 13 makes it impracticable to prevent rotation of such driven element by means of a brake, as in the construction illustrated in Fig. 1, it becomes advisable to provide some means for moving the shoes 15 inwardly out of contact with the casing 12 in order to decrease the torque transmitted to the driven element 13. Such a means is illustrated in Fig. 4.

In the construction illustrated in Fig. 4, each of the shoes 15 is radially slidable upon its associated trunnion piece 16. Axially slidable in each of the trunnion pieces 16 is an actuating member 60 by axial movement of which the associated shoe 15 may be either moved inwardly out of engagement with the casing 12, forced outwardly into firm frictional engagement with the casing 12, or permitted to float in such a manner that the force with which it bears against the casing 12 depends upon the centrifugal force resulting from rotation of the casing.

To this end, each of the actuating rods 60 is shown as provided in its outer face with a pair of cam grooves 61 and on its inner face with a pair of cam projections 62. Radially slidable in the trunnion piece 16 are two pairs of pins 63 and 64. The inner ends of the pins 63 extend respectively into the cam grooves 61, and their outer ends bear against the shoe 15. The outer ends of the pins 64 bear against the cam projection 62, and their inner ends bear against the cap 17, which is rigid with the shoe.

With the construction described, it will be apparent that the shoe 15 can be moved inwardly or outwardly on its associated trunnion piece 16 by longitudinal movement of the actuating member 60. As shown in Fig. 4, the pins 64 are in engagement with the highest part of the cam-projections 62, and the shoes are therefore retracted from engagement with the circumferential wall of the casing 12. If the actuating rod 60 is moved to the left from the position illustrated in Fig. 4, the shoes 15 will be permitted to move radially outward under the influence of the centrifugal force to which they are subjected as a result of the rotation of the casing 12.

If leftward movement of the actuating rod 60 is continued until the pins 63 are engaged by the sloping ends of the grooves 61, the shoes 15 will be forced outwardly by the camming action of the end-walls of the grooves, and the outwardly exerted force thus imposed on the shoe 15 is added to the effective centrifugal force to increase the friction between such shoe and the casing 12.

Desirably, the cam grooves 61 are longer than the cam projections 62 in order to provide, between the limits of movement of the actuating rod 60, a condition in which the shoe 15 floats in such a manner that the friction between it and the casing 12 is dependent only upon the speed with which the casing rotates.

For the purpose of moving the actuating rods 60, each of them may be provided with a grooved head 66, the groove of which receives the intermediate portion of an operating lever 67. The outer ends of the operating lever 67 are pivotally mounted as at 68 on the casing 12, near the periphery thereof; and the inner ends of such rods extend into an annular groove on a shiftable collar 69 which is adapted to be moved axially of the shaft 13 by any convenient operating mechanism.

When the actuating rods 60 in the clutch illustrated in Fig. 4 are in their intermediate position of adjustment, the clutch acts in substantially the same manner as does the clutch illustrated in Figs. 1 and 2. That is, the proportion of the driving torque transmitted to the driven clutch element 13 is proportional to the rate at which the casing 12 rotates and to the rate of relative rotation of the casing 12 and the driven element 13. If it is desired to increase the torque transmitted to the driven element 13, the control collar 69 can be moved to the left to cause the sloping end-walls of the cam grooves 61 to force the shoes 15 outwardly into firmer frictional contact with the casing 12. If it is desired to decrease the torque transmitted to the driven element 13 the control collar 69 may be moved to the right—that is, to or toward the position illustrated in Fig. 4—and this will result in decreasing the frictional drag imposed on the shoes 15 and will thereby decrease opposition to their oscillation.

I claim as my invention:—

1. In combination, two relatively rotatable coaxial members, one or more cranks carried by one of said members, one or more friction elements pivotally mounted in the other of said rotatable members and having frictional engagement therewith, and means operatively interconnecting said friction elements and said cranks to produce oscillation of said friction elements about their respective axes when said two rotatable members rotate relatively to each other.

2. In combination, relatively rotatable driving and driven members, one or more cranks carried by said driven member, one or more friction elements pivotally mounted in said driving member and having frictional contact therewith, and means operatively interconnecting said cranks and friction elements to produce oscillation of said friction elements about their respective axes when said driving and driven members rotate relatively to each other.

3. In combination, two relatively rotatable coaxial members, one or more friction elements pivotally mounted in the other of said rotatable members and having frictional engagement therewith, and means operatively interconnecting said friction elements and the other of said rotatable members to produce oscillation of said friction elements about their respective axes when said two rotatable members rotate relatively to each other.

4. In combination, relatively rotatable driving and driven members, one or more friction elements pivotally mounted in said driving member and having frictional contact therewith, and means operatively interconnecting said driven member and friction elements to produce oscillation of said friction elements about their respective axes when said driving and driven members rotate relatively to each other.

5. The combination set forth in claim 3 with the addition that said friction elements are floatingly mounted in order that the force with which they bear against the rotatable member in which they are mounted may be dependent upon centrifugal force created by rotation of such rotatable member.

6. The combination set forth in claim 4 with the addition that said friction elements are floatingly mounted in said driving member in order that the force with which they bear upon said driving member may be dependent upon centrifugal force created by rotation of the driving member.

7. In combination, relatively rotatable driving and driven members, one or more friction elements movably carried by said driving member and having frictional contact therewith, means operatively interconnecting said friction elements and said driven member to produce movement of said friction members in said driving member when said driving and driven members rotate relatively to each other, a power-transmitting element adapted to receive power from said driven member, releasable means for interconnecting said driven member, and power-transmitting element, and brake means associated with said driven member.

8. In combination, relatively rotatable driving and driven members, one or more inertia elements movably carried by said driving member, means operatively interconnecting said inertia elements and said driven member to produce oscillation of said inertia members in said driving member when said driving and driven members rotate relatively to each other, a power-transmitting element adapted to receive power from said driven member, releasable means for interconnecting said driven member and power-transmitting element, and brake means associated with said driven member.

9. The combination set forth in claim 3 with the addition of means for moving said friction element out of frictional engagement with the members in which they are mounted.

10. The combination set forth in claim 4 with the addition of means for moving said friction element out of frictional engagement with said driving member.

11. The combination set forth in claim 3 with the addition of means for positively forcing said friction elements into firm frictional engagement with the members in which they are mounted.

12. The combination set forth in claim 4 with the addition of means for positively forcing said friction elements into firm frictional engagement with said driving member.

In witness whereof, I have hereunto set my hand at Indianapolis, Indiana, this 2d day of June, A. D. one thousand nine hundred and thirty.

ROBERT C. BERRY.